United States Patent
Simmons et al.

(10) Patent No.: US 9,614,668 B1
(45) Date of Patent: Apr. 4, 2017

(54) CONVERSION SCHEMES FOR CRYPTOGRAPHY SYSTEMS

(71) Applicant: ISARA Corporation, Waterloo (CA)

(72) Inventors: Sean Simmons, Waterloo (CA); Jiayuan Sui, Burlington (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

(21) Appl. No.: 15/265,355

(22) Filed: Sep. 14, 2016

(51) Int. Cl.
| | |
|---|---|
| *H04L 9/06* | (2006.01) |
| *H04L 9/30* | (2006.01) |
| *G06F 21/72* | (2013.01) |
| *H04L 29/06* | (2006.01) |
| *H04L 9/28* | (2006.01) |
| *H04L 9/14* | (2006.01) |

(52) U.S. Cl.
CPC ............ *H04L 9/0643* (2013.01); *G06F 21/72* (2013.01); *H04L 9/14* (2013.01); *H04L 9/28* (2013.01); *H04L 9/30* (2013.01); *H04L 63/0428* (2013.01)

(58) Field of Classification Search
CPC ..... H04L 9/14; H04L 9/28; H04L 9/30; H04L 9/0625; H04L 9/0643; H04L 63/0428; H04L 63/04; H04L 63/0435; G06F 21/602; G06F 21/72
See application file for complete search history.

(56) References Cited

U.S. PATENT DOCUMENTS

| | | | | |
|---|---|---|---|---|
| 5,949,884 | A * | 9/1999 | Adams | H04L 9/0625 380/29 |
| 7,039,192 | B1 * | 5/2006 | Whelan | H04L 63/0442 380/278 |
| 9,407,437 | B1 * | 8/2016 | Campagna | H04L 9/14 |
| 2007/0081668 | A1 * | 4/2007 | McGrew | H04L 9/0637 380/37 |
| 2011/0096923 | A1 * | 4/2011 | Rollgen | H04L 9/0625 380/28 |
| 2011/0211691 | A1 * | 9/2011 | Minematsu | H04L 9/0618 380/46 |
| 2012/0300925 | A1 | 11/2012 | Zaverucha et al. | |
| 2013/0073850 | A1 | 3/2013 | Zaverucha | |
| 2013/0287207 | A1 | 10/2013 | Zaverucha et al. | |
| 2013/0290713 | A1 | 10/2013 | Zaverucha et al. | |

(Continued)

OTHER PUBLICATIONS

Kobara et al., Semantically Secure McEliece Public-Key Cryptosystems: Conversions for McEliece PKC, 2001, 17 pages.

(Continued)

*Primary Examiner* — Tae Kim
(74) *Attorney, Agent, or Firm* — Henry Patent Law Firm PLLC

(57) ABSTRACT

In a general aspect, a conversion scheme is used with a cryptographic system. In some aspects, a pad bit vector is generated based on a size of a message bit vector, and a record bit vector is generated based on the pad bit vector. The record bit vector indicates the size of the pad bit vector. The record bit vector, the message bit vector, and the pad bit vector are combined to yield a first bit vector. A hash function is applied to the first bit vector, and an encryption function is applied to a portion of the first bit vector. A ciphertext is generated based on the output of the hash function and the output of the encryption function.

25 Claims, 5 Drawing Sheets

(56) References Cited

U.S. PATENT DOCUMENTS

2014/0019771 A1* 1/2014 Emmett ............... H04L 9/002
  713/189
2014/0355754 A1* 12/2014 Leung ................ H04L 9/28
  380/28

OTHER PUBLICATIONS

McEliece, A Public-Key Cryptosystem Based on Algebraic Coding Theory, DSN Progress Report, 1978, 3 pages.
Misoczki et al., MDPC-McEliece: New McEliece Variants from Moderate Density Parity-Check Codes, 2013, 22 pages.
Wikipedia, Niederreiter Cryptosystem, 2016, 3 pages.
RSA Laboratories, PKCS #1 v2.2: RSA Cryptography Standard, 2012, 63 pages.
Pointcheval, Chosen-Ciphertext Security for any One-Way Cryptosystem, 2000, 17 pages.
Fujisaki et al., Secure Integration of Asymmetric and Symmetric Encyption Schemes, 1999, 18 pages.
Repka et al., Overview of the McEliece Cryptosystem and Its Security, 2014, 27 pages.
Jonsson et al., RFC 3447, Network Working Group, Public-Key Cryptography Standards (PKCS) #1: RSA Cryptography Specifications Version 2.1, 2003, 68 pages.

* cited by examiner

CONVERSION SCHEMES FOR CRYPTOGRAPHY SYSTEMS

BACKGROUND

The following description relates to a conversion scheme for cryptography systems.

Cryptography systems are used to communicate securely over public channels. For example, some cryptography systems allow messages to be encrypted by a public key and decrypted by a private key. Conversion schemes have been used to secure cryptography systems against certain types of attacks.

DETAILED DESCRIPTION

In some aspects of the present disclosure, a conversion scheme is used to generate or decrypt a ciphertext. In some instances, the conversion scheme is used with a cryptography system, such as a public-key-based encryption system, that specifies encryption and decryption protocols. Many cryptography systems (e.g., at least some variants of McEliece, RSA, and El Gamal cryptography systems) are vulnerable to certain attacks, such as, for example, an Adaptive Chosen-Ciphertext (CCA2) attack. In some cases, such vulnerabilities can be removed by using a conversion scheme with the cryptography system. In some instances, the conversion scheme transforms an original message (or plaintext) into an object (or cleartext) that is encrypted according to the selected cryptography system to produce the ciphertext. In some instance, the ciphertext is decrypted according to the selected cryptography system to yield the cleartext, and the conversion scheme transforms the cleartext to the original message (or plaintext).

In some instances, in addition to providing security against certain types of attacks, a conversion scheme may be configured to provide other advantages. For instance, a conversion scheme can provide small (in some cases, minimal) ciphertext redundancy, allow for messages of arbitrary size (e.g., arbitrarily large or arbitrarily small messages) to be encrypted, obscure the size of the plaintext or provide other advantages. In some implementations, a conversion scheme generates a pad bit vector and a record bit vector that are combined with the message bit vector to produce the cleartext. The size of the pad bit vector may depend on the size of the message to be encrypted. In some implementations, for example, small messages may be padded with a relatively large pad bit vector, and larger messages may be padded with a relatively small pad bit vector. The record bit vector may indicate the size of the pad bit vector chosen, for instance, when the size of the pad bit vector is not known a priori by the recipient of the ciphertext.

In some instances, the pad bit vector may be chosen such that it is the shortest possible bit vector that can be used with the cryptography system. For example, the pad bit vector size may be chosen such that it produces minimal ciphertext redundancy. In some instances, the pad bit vector may be chosen such that, when the pad bit vector, record bit vector, and the message bit vector are combined, the combination is large enough to satisfy input size parameters of the encryption system. As an example, portions of the combined bit vector may be used as inputs to an encryption function and a conversion function. In some instances, a conversion scheme can adapt the size of the pad bit vector based on the size of the message, so that the size of the message is not exposed to adversaries, while also accommodating large and small messages (e.g., messages ranging from one bit to several Gigabytes in some cases).

Figure 1:
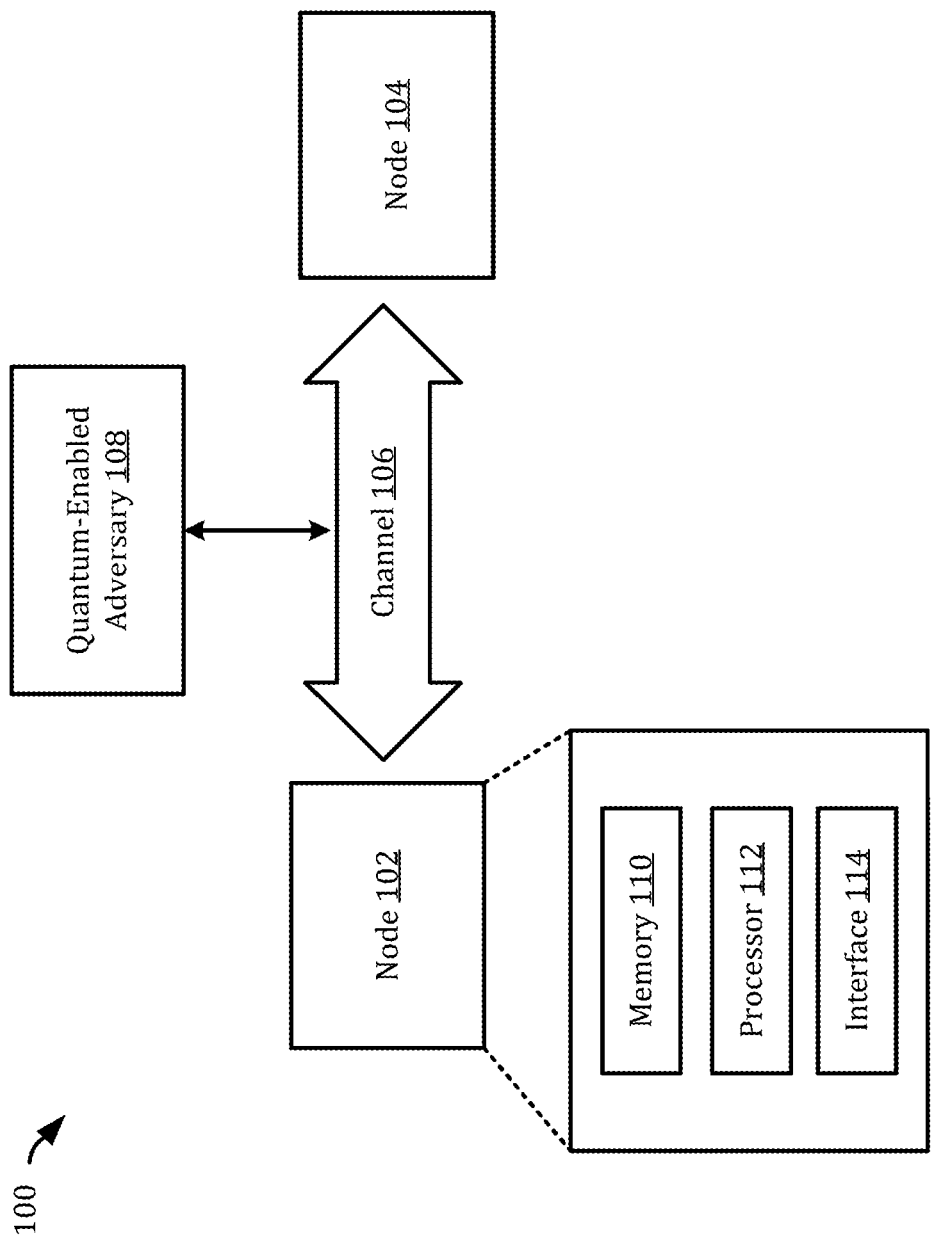
FIG. 1 is a block diagram showing aspects of an example communication system.

FIG. 1 is a block diagram showing aspects of an example communication system 100. The example communication system 100 shown in FIG. 1 includes two nodes 102, 104 that use a cryptography system (a "cryptosystem") to communicate with each other over a channel 106. In the example shown, a quantum-enabled adversary 108 has access to information exchanged on the channel 106. A communication system may include additional or different features, and the components in a communication system may be configured to operate as shown or in another manner.

In some implementations, the nodes 102, 104 have a server-client relationship. For example, the node 102 can be a server and the node 104 can be its client in a served network, or vice-versa. In some implementations, the nodes 102, 104 have a peer-to-peer relationship. For example, the nodes 102, 104 can be peers in a peer-to-peer network. The nodes 102, 104 may have another type of relationship in the communication system 100.

The example nodes 102, 104 each have computational resources (e.g., hardware, software, firmware) that are used to communicate with other nodes. In some implementations, the nodes 102, 104 can be implemented in various systems, such as, for example, laptops, desktops, workstations, smartphones, tablets, personal digital assistants, servers, server clusters, mainframes, and other types of computer systems. As shown in FIG. 1, the example node 102 includes a memory 110, a processor 112 and an interface 114. Each of the nodes 102, 104 may include the same, additional or different components, and the nodes 102, 104 may be configured to operate as shown and described with respect to FIG. 1 or in another manner.

In the example node 102 shown in FIG. 1, the memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in any of FIGS. 2, 3, 4 and 5.

In the example node 102 shown in FIG. 1, the processor 112 can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in any of FIGS. 2, 3, 4 and 5.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes or devices. In some cases, the interface 114 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 114 includes a wired communication interface (e.g., display port, USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. In some examples, the channel 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner.

The example quantum-enabled adversary 108 shown in FIG. 1 can access information exchanged on the channel 106. For example, the quantum-enabled adversary 108 may access some or all of the information sent from the node 102 to the node 104 or to another recipient. In some instances, the quantum-enabled adversary 108 can directly observe correspondence between the nodes 102, 104; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms or perform other classically-hard computational tasks fast enough to compromise the security of certain cryptographic algorithms. For example, the quantum-enabled adversary 108 may be capable of computing prime factors fast enough to compromise certain RSA encryption standards or computing discrete logarithms fast enough to compromise certain ECC encryption standards.

In the example shown in FIG. 1, the nodes 102, 104 can use quantum-resistant cryptographic protocols and conversion schemes that cannot be compromised by the example quantum-enabled adversary 108. For instance, the nodes 102, 104 may use a cryptographic protocol and conversion scheme that is secure against a quantum computer that can efficiently execute Shor's algorithm or other types of algorithms that are known to compromise the security of certain conventional cryptography standards.

In some implementations, the nodes 102, 104 use a cryptographic protocol and conversion scheme that allows each node to send confidential messages to the other node. The cryptographic protocol and conversion scheme can be quantum-secure, such that communications over the channel 106 are secure against quantum-enabled adversaries. The cryptographic protocol and conversion scheme can be classically-secure, such that communications over the channel 106 are secure against classically-enabled adversaries. In some implementations, the cryptographic protocols are based on a public-key cryptography system. Examples of public-key cryptography systems include McEliece-type cryptography systems, Paillier-type cryptography systems, RSA-type cryptography systems, Niederreiter-type cryptography systems, elliptic-curve-type cryptography systems, El Gamal-type cryptography systems and others. In some examples, the nodes 102, 104 can use the example techniques shown in any one or more of FIGS. 2, 3, 4 and 5, or the nodes 102, 104 may use variations of these and other techniques to communicate on the channel 106.

Figure 2:
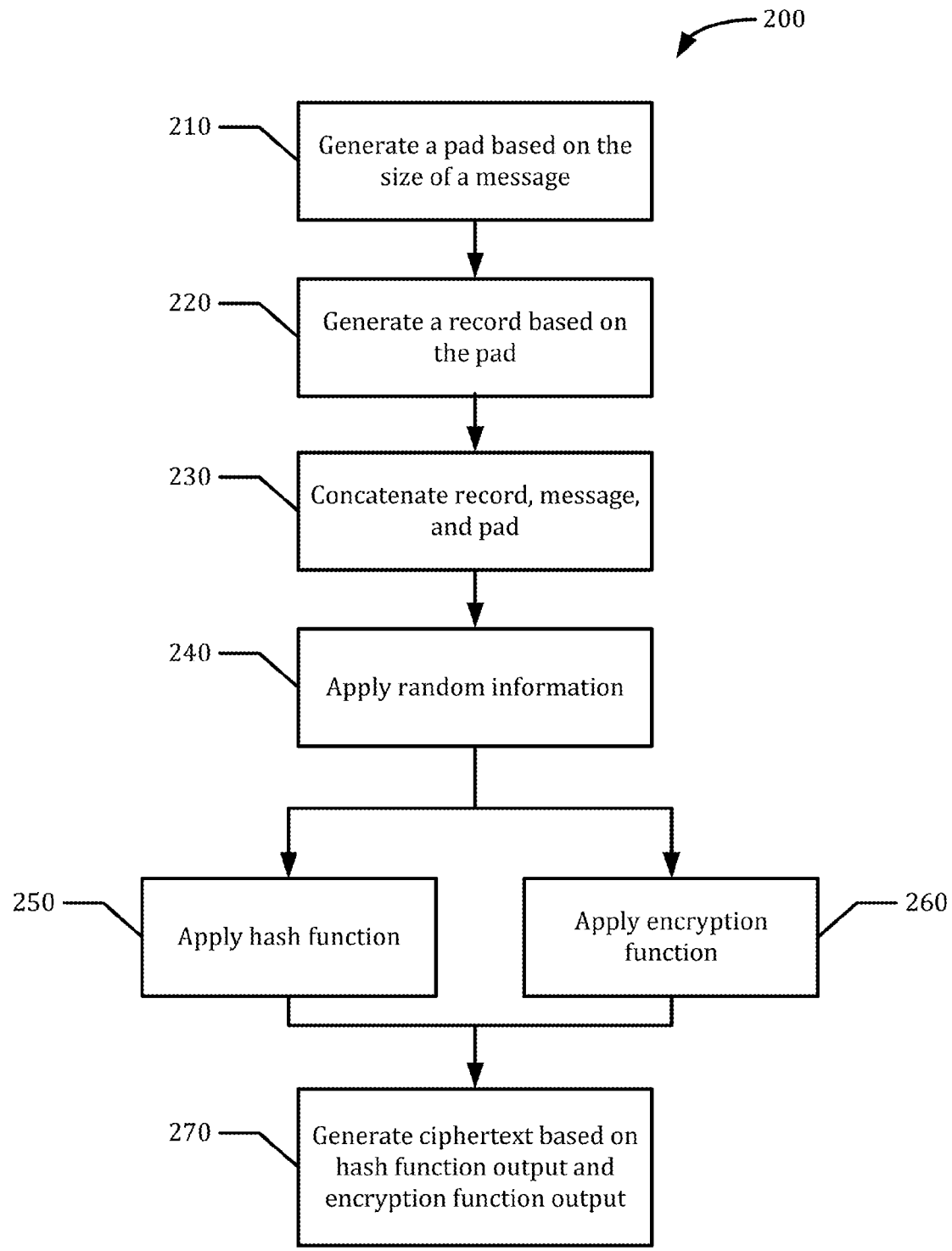
FIG. 2 is a flow diagram showing an example process for generating a ciphertext.
Figure 3:
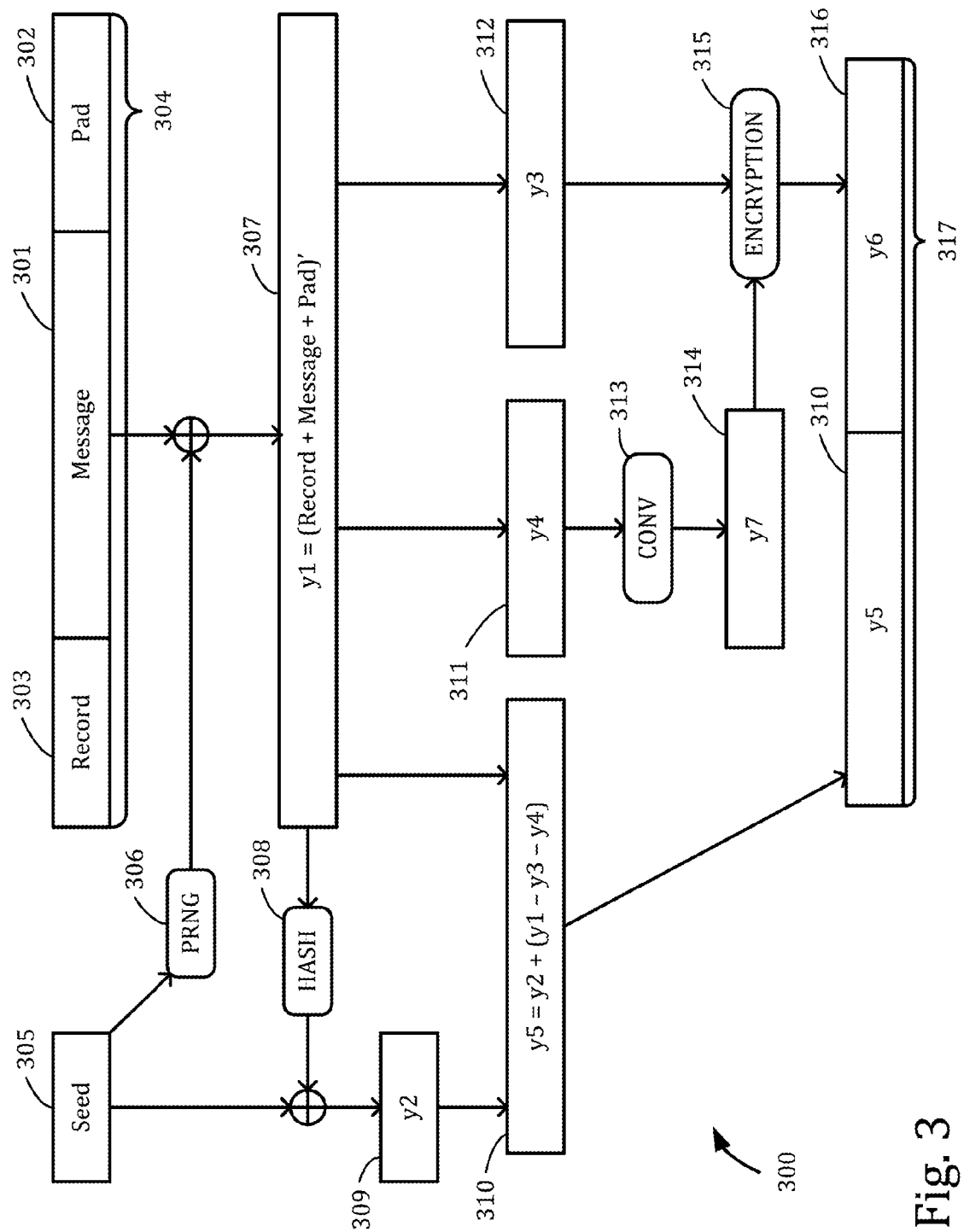
FIG. 3 is a flow diagram showing an example process for generating a ciphertext.

FIG. 2 is a flow diagram showing an example process 200 for generating a ciphertext. The example process 200 can be performed, for example, by a computer system. For instance, operations in the process 200 may be performed by either of the nodes 102, 104 in the example communication system 100 shown in FIG. 1 or by another type of computing system. In some cases, one or more of the operations shown in FIG. 2 are implemented as processes that include multiple operations, sub-processes or other types of routines. In some cases, operations can be combined, performed in parallel, iterated or otherwise repeated or performed in another manner. The process 300 shown in FIG. 3 represents an example implementation of the process 200 shown in FIG. 2; while certain operations shown in FIG. 2 are described with reference to the example implementation shown in FIG. 3, the operations shown in FIG. 2 may be implemented in another manner.

In some instances, the example process 200 is implemented in a manner that is secure against certain types of attacks, such as, for example CCA2 attacks or other types of attacks. In some examples, the process 200 is secure against quantum-enabled adversaries such as, for example, the quantum-enabled adversary 108 shown in FIG. 1. The example process 200 may also provide security against classically-enabled adversaries who do not necessarily have access to quantum computers or other quantum resources.

The example process 200 generates the ciphertext based on a message (e.g., a plaintext message). Generally, the message can be of any type, any size and any format. In some examples, the message can be an e-mail message, an electronic document, or an electronic file that can be processed by a software application. In some examples, the message can be a data packet or a data object that can be processed by hardware or firmware. In some examples, the message includes keying material (which may range from 32 to 48 bytes in some examples) generated for transmission between nodes over a public channel. The message can be formatted as a binary string or another format in some cases.

At 210, a pad is generated based on the size of the message. For instance, in the example shown in FIG. 3, a pad bit vector 302 is generated based on the message bit vector 301. In some implementations, the size of the pad is determined based on the size of the message. In the example shown in FIG. 3, in some instances, the pad bit vector 302 has a size that depends on the size of the message bit vector 301. In some cases, after the size of the pad is determined based on the message size, a pad having the determined size is produced.

In some instances, the pad is sized to a predetermined minimum pad size. The minimum pad size can be used, for instance, to minimize redundancy or to otherwise improve efficiency. In some examples, the minimum pad size (e.g., 256-bits or another minimum pad size) is the pad size that ensures ciphertext integrity can be verified during the decryption process. In some instances, the pad is sized larger than the minimum pad. A size larger than the minimum pad size may be used, for instance, to improve security. For example, the size of the pad may be chosen in a manner that obscures the size of the message from an adversary's perspective. In some cases, the size of the pad may be chosen to ensure that, when the message size is less than a threshold value, the size of the ciphertext remains constant regardless of the message size. Accordingly, the pad generated for a relatively small message may be larger than the pad generated for a larger message.

In some cases, the pad is generated from an initial pad bit vector. After determining the size of the pad based on the message, the initial pad bit vector can be truncated or otherwise processed to yield a pad having the determined size, which may be smaller than the initial pad bit vector. In some implementations, the initial pad bit vector may be generated by applying a hash function or key derivation function to a public parameter (e.g., a public bit string), by retrieving a predetermined value from memory, or by another technique. The size of the initial pad bit vector can be set equal to a maximum pad size. For instance, in the example shown in FIG. 3, the initial pad bit vector may be of size (q+k), where q represents the size of an input to the conversion function 313 and k represents the size of an input to the encryption function 315. The maximum pad size can specify the size of pads to be used with minimum-size messages. For instance, the maximum pad size can be the pad size for a zero-bit or one-bit message (or another minimum size for the message).

In cases where the pad is generated based on a public value (e.g., a public constant bit vector), the public value can also be used to verify the integrity of the ciphertext during the decryption process. For example, a hash function, a key derivation function or another type of function can generate the pad (or the initial pad) from the public constant, so that the pad value is generated based on information that is readily available to both the encryption process and decryption process. In some implementations, the pad is generated based on other information or by another type of process.

In some implementations, the size of the pad is determined based on one or more parameters of an encryption function to be applied during the process 200 (e.g., one or more parameters of the encryption function applied at 260). In some implementations, the size of the pad is determined based on one or more parameters of another function to be applied during the process 200 (e.g., a conversion function that produces an input for the encryption function applied at 260). For instance, in some cases, an encryption function is configured to receive first and second encryption function inputs during the process 200, a conversion function is configured to receive a conversion function input during the process 200, and the size of the pad generated at 210 is determined based in part on the size of the first encryption function input and the size of the conversion function input.

At 220, a record is generated based on the pad. For instance, in the example shown in FIG. 3, the record bit vector 303 is generated based on the size of the pad bit vector 302. The record may have a size that is fixed; for instance, the size of the record may be independent of the message size and pad size. The size of the record may be based on the maximum pad size. For example, the size of the record may be greater than or equal to the size of a binary representation of the maximum pad size, so that the record is large enough to indicate any value up to the maximum pad size. For instance, in the example shown in FIG. 3, the size of the record bit vector 303 is equal to $\lceil \log_2 (q+k) \rceil$. Here, the $\lceil \cdot \rceil$ operator represents the "ceiling function," which rounds the input ($\log_2 (q+k)$, in this example) to the nearest integer greater than the input. In some examples, the record is 16-bits in size.

In some implementations, the record indicates the size of the pad. For instance, the record can be a binary value that explicitly represents the size of the pad. In the example shown in FIG. 3, the record bit vector 303 indicates the size of the pad bit vector 302. In this manner, the record allows the decryption process to identify the size of the pad, so that the message boundaries can be identified and the message can be extracted.

At 230, the record, the message, and the pad are concatenated. In some implementations, the record, the message, and the pad are concatenated to yield a concatenated bit vector. The concatenated bit vector may be formed, for example, according to any of the following examples:

(record bit vector)||(message bit vector)||(pad bit vector);
(record bit vector)||(pad bit vector)||(message bit vector); or
(pad bit vector)||(message bit vector)||(record bit vector), where the || operator refers to concatenation of the bit vectors. In the example shown in FIG. 3, the record bit vector 303, the message bit vector 301, and the pad bit vector 302 are concatenated to yield the concatenated bit vector 304. In some cases, the record, the message, and the pad can be combined with other information, or they may be combined in another manner.

At 240, random information is applied to the concatenation generated at 230. The random information may be applied, for example, by applying an exclusive-or (XOR) operation to the random information and the concatenation generated at 230. The random information may be obtained from a pseudorandom number generator that has been seeded with a seed. The seed may be, for instance, a random bit vector. The seed may be chosen, in some implementations, such that its size is the same as the output of the hash function applied at 250. In some implementations, applying the random information to the concatenation yields a cleartext. In the example shown in FIG. 3, an exclusive-or function is applied to the concatenated bit vector 304 and a random bit vector to yield the first bit vector 307. The random information may be applied in another manner in some cases.

At 250, a hash function (e.g., a cryptographic hash function) is applied to the cleartext generated at 240. For instance, in the example shown in FIG. 3, the hash function 308 is applied to the first bit vector 307. In some implementations, the hash function is a one-way hash function that takes an arbitrary-size binary string as an input and converts the string to a fixed-size binary string output. In some cases, the hash function can be SHAKE-128, SHAKE-256, SHA3-256, ChaCha20, HMAC-DRBG, any of the SHA-2 family (e.g., SHA-256, SHA-512) algorithms or possibly others. The hash function may be applied to the entire cleartext, or the hash function may be applied to another bit vector that is based on the cleartext in some cases.

At 260, an encryption function is applied to the cleartext generated at 240. The encryption function may be applied to all of the cleartext or a portion of the cleartext. The encryption function may generate an encryption function output based on the cleartext and additional information such as, for example, a public key or a symmetric key. In the example shown in FIG. 3, the encryption function 315 is applied to the third bit vector 312, which is a first portion of the first bit vector 307. In some implementations, the encryption function is a quantum-secure encryption function. For instance, the encryption function can be a McEliece encryption function, a Niederreiter encryption function, or another type of encryption function.

At 270, the ciphertext is generated based on the output of the hash function (generated at 250) and the output of the encryption function (generated at 260). In some implementations, for example, one or more functions or operations may be applied to the outputs of the hash function and the encryption function or portions thereof, and the output of those functions or operations may be used in generating the ciphertext. In the example shown in FIG. 3, the encryption function output is combined with a fifth bit vector 310 to yield the ciphertext 317. The ciphertext may be generated in another manner.

The ciphertext may then be sent to a recipient in a communication system. For example, referring to FIG. 1, the node 102 may generate ciphertext according to process 200 and send the ciphertext over the channel 106 to the node 104. Upon receipt of the ciphertext, the recipient may execute a decryption process to generate the message. In some cases, the decryption process can be implemented according to the example process 400 shown in FIG. 4, or the decryption process can be implemented in another manner.

FIG. 3 is a flow diagram showing an example process 300 for generating a ciphertext. The example process 300 can be performed, for example, by a computer system. For instance, operations in the process 300 may be performed by either of the nodes 102, 104 in the example communication system 100 shown in FIG. 1 or in another type of system. The example process 300 may include additional or different operations, and the operations may be performed in the order shown or in another order. In some cases, one or more of the operations shown in FIG. 3 are implemented as processes that include multiple operations, sub-processes or other types of routines. In some cases, operations can be combined, performed in parallel, iterated or otherwise repeated or performed in another manner.

In some instances, the example process 300 is implemented in a manner that is secure against certain types of attacks, such as, for example CCA2 attacks or other types of attacks. In some examples, the process 300 is secure against quantum-enabled adversaries such as, for example, the quantum-enabled adversary 108 shown in FIG. 1. The example process 300 may also provide security against classically-enabled adversaries who do not have access to quantum computers or other quantum resources. In certain implementations, the process 300 represents a conversion scheme that can allow encryption of messages of arbitrary size, hide the size of short plaintext messages (e.g., messages smaller than a threshold size), provide reduced ciphertext redundancy or a combination of these and other advantages.

The example process 300 shown in FIG. 3 includes a pseudorandom number generator (PRNG) 306, a hash function 308, a conversion function 313 and an encryption function 315. The process 300 also includes multiple exclusive-or (XOR) functions. The process 300 may include additional or different functions. The functions in the process 300 can be implemented, for instance, in software, hardware firmware or combinations thereof. Generally, each function receives one or more input bit vectors and produces one or more output bit vectors. In the discussion of FIG. 3, the size of a bit vector refers to the bit-length of the object in units of bits. The size of a bit vector (or other data object) may be defined in another manner, for instance, in units of bytes, multi-byte words or otherwise. Moreover, a bit vector as described with respect to FIG. 3, may be implemented as a bit array, a bit string or another type of binary data object.

The exclusive-or (XOR) functions applied in the example process 300 shown in FIG. 3 are each configured to receive two XOR function inputs and produce an XOR function output. Typically, the two XOR function inputs are bit vectors of equal size, and the XOR function output is another bit vector that is the same size as the inputs. The XOR function output can be generated, for example, by applying exclusive-or gates to respective pairs of bits from the XOR function inputs (e.g., bits at corresponding positions in the input bit vectors).

The example PRNG 306 is configured to receive a seed bit vector 305 of size h and produce a pseudorandom binary sequence. The seed bit vector 305 can be, for example, a random value having a fixed size h. The size of the output produced by the PRNG 306 can be specified, for instance, based on the size of the concatenated bit vector 304. For instance, the PRNG 306 can produce an output that is the same size as the concatenated bit vector 304, so that the output of the PRNG 306 can be used as a random bit string in an exclusive-or function applied to the concatenated bit vector 304.

The example hash function 308 is a cryptographic hash function configured to receive a variable-size input and produce a fixed-size output of size h. As shown in FIG. 3, the first bit vector 307 is provided as the hash function input, and the size of the first bit vector 307 depends on the size of the message bit vector 301, the size of the pad bit vector 302 and the size of the record bit vector 303. The hash function output and the seed bit vector 305 are the same size, so that an exclusive-or function can be applied to them to yield the second bit vector 309.

The example conversion function 313 is configured to receive a conversion function input of size q and produce a conversion function output of size n. In the example shown in FIG. 3, the conversion function 313 is a bijective function that converts the fourth bit vector 311 to a seventh bit vector 314. The bijective function can convert each possible input of size q to a unique output of size n. In some implementations, the seventh bit vector 314 has a specified weight t and is used by the encryption function 315, for instance, to increase entropy or add error to the cleartext that is encrypted by the encryption function 315. The weight t of a bit vector can be, for instance, the Hamming weight, which refers to the number of set bits (ones) in the bit vector. In some implementations, the weight t is a parameter that is specified by the encryption function 315, and the fourth bit vector 311 is used as an index to select a particular bit vector of all possible bit vectors having the specified weight t. For example, the conversion function 313 may have access to a precomputed database that indexes all possible bit vectors having the specified weight t, or the conversion function 313 may be able to compute a specified bit vector given an index; and the seventh bit vector 314 can be the bit vector having an index equal to the fourth bit vector 311.

The encryption function 315 is configured to receive a first encryption function input of size k and a second encryption function input of size n, and produce an encryption function output of size n. In some examples, the encryption function 315 is a partially trapdoor one-way function. For example, the encryption function may be based on the McEliece cryptography system or the Niederreiter cryptography system. Other types of cryptography systems may be used. In the example shown in FIG. 3, a third bit vector 312 is provided as the first encryption function input, the seventh bit vector 314 is provided as the second encryption function input, and a sixth bit vector 316 is provided as the encryption function output. The third bit vector 312 can be considered the plaintext for the encryption function 315, and the sixth bit vector 316 can be considered the ciphertext that is produced by applying the encryption function 315 to the third bit vector 312. The seventh bit vector 314 is provided as an additional input to the encryption function 315. For instance, when the McEliece cryptography system is used, the seventh bit vector 314 serves as the error vector.

The encryption function 315 may receive additional input such as, for example, a public key or another input parameter that is used to generate the encryption function output.

In some implementations, the size q of the conversion function input can be based on the parameters of the encryption function 315. For instance, the size q of the conversion function input (specified by the conversion function 313), may be based on one or more encryption function inputs or encryption function outputs (specified by the encryption function 315). In the example shown in FIG. 3, the size q is based on the size and weight of the second encryption function input (the size n and weight t of the seventh bit vector 314). For instance, the size q of the conversion function input can be $$q = \left\lfloor \log_2 \binom{n}{t} \right\rfloor,$$

which is the binary size of an integer representing the number of possible integers of size n having weight t.

As shown in FIG. 3, a message bit vector 301 is provided as an input to the process 300. A pad bit vector 302 is generated based on the message bit vector 301. The pad bit vector 302 may be generated based on the size of the message bit vector 301. For instance, a smaller pad bit vector 302 may be generated for relatively large message bit vectors, and a larger pad bit vector 302 may be generated for relatively small message bit vectors. A record bit vector 303 is generated to indicate the size of the pad bit vector 302. The record bit vector 303 can have a fixed size that is large enough to allow the record bit vector 303 to indicate any value up to the largest allowable size of the pad bit vector 302. For example, if the maximum size of the pad bit vector 302 is (q+k), then the size of the record bit vector can be greater than or equal to $\lceil \log_2 (q+k) \rceil$, where q represents the size of the conversion function input and k represents the size of the first encryption function input. In some examples, the record bit vector 303 is 16-bits in size.

In the example shown in FIG. 3, the message bit vector 301 is combined with the pad bit vector 302 and the record bit vector 303 (by concatenating the message bit vector 301, the pad bit vector 302 and the record bit vector 303, and then applying an exclusive-or function to the concatenation and a random bit vector), and portions of the combination are used as inputs to the conversion function 313 and the encryption function 315. The input sizes for the conversion function 313 and the encryption function 315 are fixed parameters (specified by the conversion function 313 and the encryption function 315) that are known a priori, and the pad bit vector 302 can be generated in a manner that ensures that the process 300 provides appropriately-sized inputs for the conversion function 313 and the encryption function 315.

In some implementations, the pad bit vector 302 is generated from an initial pad bit vector. For instance, the initial pad bit vector can be generated to have the maximum pad size. In the example shown in FIG. 3, an initial pad bit vector of size (q+k) may be generated using a hash function, a key derivation function, or another type of function that takes a public constant value as an input. In some instances, it may be determined based on the size of the message bit vector 301 that a pad having the maximum pad size will be used to produce the ciphertext 317, and the initial pad bit vector can be used as the pad bit vector 302. In some instances, it may be determined based on the size of the message bit vector 301 that a pad having less than the maximum pad size will be used to produce the ciphertext 317. The pad bit vector 302 having the determined size can be generated by a hash function, a key derivation function or another type of function that takes a public constant value as an input, or an initial pad bit vector can be truncated or otherwise reduced to form the pad bit vector 302.

In some implementations, a minimum pad size can be determined for the process 300. The minimum pad size may ensure that the ciphertext 317 is large enough that a decryption process can properly verify integrity of the ciphertext 317. For example, the size of the pad bit vector 302 may be such that it is always greater than, or equal to, a minimum pad size m (e.g., 256-bits) for verifying ciphertext integrity of minimum-sized messages. In some instances, a pad bit vector having the minimum pad size is used, for example, to minimize redundancy or otherwise enhance efficiency for larger messages. In some instances, a pad bit vector larger than the minimum pad size is used for smaller messages, for example, to hide or obscure the size of the message bit vector 301 from an adversary.

In some instances, the pad bit vector 302 is generated such that its size is less than the maximum pad size and greater than the minimum pad size. In some implementations, the combined size of the message bit vector 301, the record bit vector 303, and the minimum pad size m can be expressed $$z = \text{length(message)} + \text{length(record)} + m$$

where length(message) represents the size of the message bit vector 301 and length(record) represents the size of the record bit vector 303. In some implementations, the size of the pad bit vector is determined such that the size of the first bit vector 307 is greater than or equal to (q+k) bits, so that the first bit vector 307 is large enough to be divided into the third bit vector 312 (size k) and the fourth bit vector 311 (size q). In various instances, the pad bit vector 302 may be generated with a size that is equal to (q+k), (q+k−length(record)), (q+k−length(message)), (q+k−length(message)−length(record)), or another value.

In instances where the combined size z is less than the combined size of the input parameters to the conversion function 313 and the encryption function 315 (e.g., if z<(q+k) in the example discussed above), then the pad bit vector 302 can be sized greater than the minimum pad size m. For example, the pad bit vector 302 can be sized to ensure that the process 300 produces a ciphertext 317 having a fixed, predetermined size that does not depend on the size of the message bit vector 301, so that the size of the ciphertext 317 does not reveal to an adversary the size of the message bit vector 301. In some examples, the pad bit vector 302 is generated by truncating an initial pad bit vector, for instance, by removing a number of bits that depends on the size of the message bit vector 301 (e.g., by removing length(message)+length(record) number of bits from an initial pad bit vector of size (q+k)). In some examples, the pad bit vector 302 having the determined size is generated by a hash function or another type of function that takes a public constant value as an input.

In instances where the combined size z is greater than the combined size of the input parameters to the conversion function 313 and the encryption function 315 (e.g., if z>(q+k) in the example discussed above), then the pad bit vector 302 can be sized to a fixed, predetermined size (e.g., the minimum pad size m or another size that does not depend on the size of the message bit vector 301). In such instances, the ciphertext 317 produced by the process 300 may vary according to the size of the message bit vector 301. In some cases, the pad bit vector 302 having a fixed size is generated from an initial pad bit vector (e.g., by removing a specified number of bits), by a hash or other type of function, from stored data (e.g., by obtaining a public, predetermined minimum-size pad) or otherwise.

The message bit vector 301, the pad bit vector 302, and the record bit vector 303 are concatenated to yield the concatenated bit vector 304. In the example shown, the concatenated bit vector 304 is concatenated in the following order: (record bit vector)||(message bit vector)||(pad bit vector), where || indicates concatenation. The concatenated bit vector 304 may be formed by concatenation of the message bit vector 301, the pad bit vector 302, and the record bit vector 303 in another order.

In the example shown in FIG. 3, an exclusive-or function is applied to the concatenated bit vector 304 and an output of the PRNG 306. The output of the PRNG 306 is obtained after seeding the PRNG 306 with the seed bit vector 305. The PRNG 306 may produce an output that is the size of the concatenated bit vector 304, and the exclusive-or function can be applied to the output of the PRNG 306 and the concatenated bit vector 304 to yield the first bit vector 307, which is referred to as "y1" in FIG. 3.

In the example shown, a hash function 308 is applied to the first bit vector 307 to yield a hash function output, and an exclusive-or function is applied to the hash function output and the seed bit vector 305 to yield a second bit vector 309 (referred to as "y2" in FIG. 3). The second bit vector 309 can be combined with a portion of the first bit vector 307 to yield the fifth bit vector 310. In some implementations, the fifth bit vector 310 is composed entirely of the second bit vector 309, without any contribution from the first bit vector 307. In the example shown in FIG. 3, the fifth bit vector 310 is formed by concatenating the second bit vector 309 with a third portion of the first bit vector 307; the third portion of the first bit vector 307 is the portion that remains after parsing out a first portion to form the third bit vector 312 and a second portion to form the fourth bit vector 311.

In the example shown in FIG. 3, the third bit vector 312 and the fourth bit vector 311 (referred to as "y3" and "y4", respectively, in FIG. 3) are generated based on respective portions of the first bit vector 307. The third bit vector 312 and the fourth bit vector 311 can be generated, for instance, by parsing a specified number of bits from the first bit vector 307, or they may be generated in another manner. The sizes of the third bit vector 312 and the fourth bit vector 311 can be selected based on the conversion function 313 and the encryption function 315. In particular, the conversion function 313 is configured to receive a conversion function input of size q, and the fourth bit vector 311 is generated to have the size q (specified by the conversion function 313). Similarly, the encryption function 315 is configured to encrypt an encryption function input of size k, and the third bit vector 312 is generated to have the size k (specified by the encryption function 315).

As shown in FIG. 3, the conversion function 313 is applied to the fourth bit vector 311 to yield the seventh bit vector 314 (referred to as "y7" in FIG. 3). The encryption function 315 is applied to the third bit vector 312, using the seventh bit vector 314 as an additional input, to yield the sixth bit vector 316 (referred to as "y6" in FIG. 3). The ciphertext 317 is generated based on the encryption function output and the hash function output. As shown, the fifth bit vector 310 and the sixth bit vector 316 are combined to produce the ciphertext 317. In particular, the fifth bit vector 310 and the sixth bit vector 316 are concatenated. The ciphertext 317 may be generated based on the encryption function output and the hash function output in another manner in some cases. In some implementations, the ciphertext 317 has a size of (h+n−q−k+length(message)+length(record)+length(pad)), or the ciphertext 317 may have another size.

The example process 300 generates the ciphertext 317 in a manner that hides (from an adversary) the size of the message bit vector 301 when the message bit vector 301 is smaller than a threshold size. The threshold size can be specified based on a minimum data redundancy or other parameters. In some cases, the threshold size is (q+k−m−length(record)). As an example, for a McEliece cryptography system that achieves 256 bits of security, the following parameters may be used k=61449 bits, n=81932 bits, and t=137 bits. From n and t, we calculate q=144 bits. Let m=256 bits and length(record)=16 bits. In this example, the size of messages smaller than or equal to q+k−m−length(record)=61321 bits can be hidden.

Figure 4:
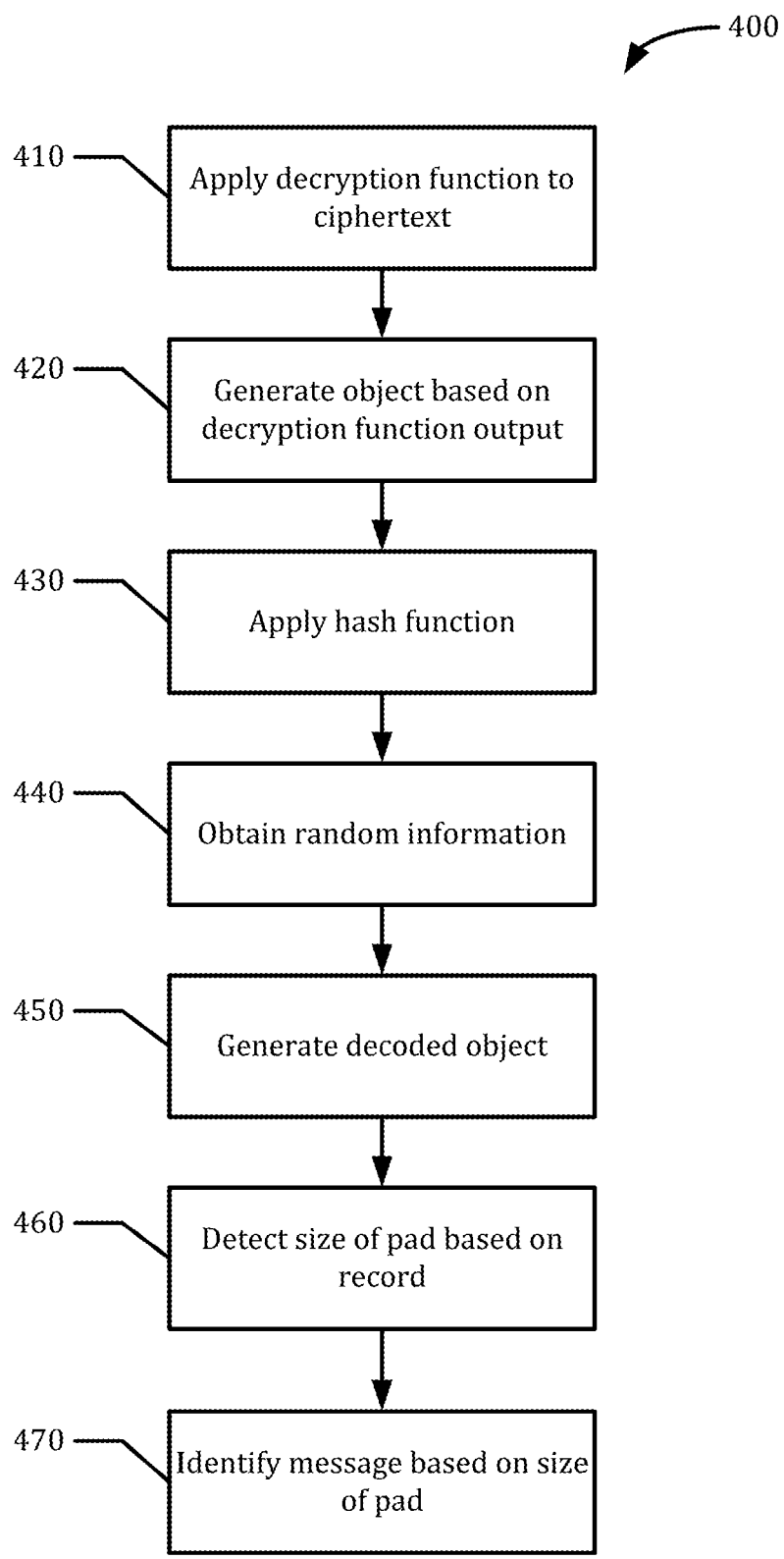
FIG. 4 is a flow diagram showing an example process for decrypting a ciphertext.
Figure 5:
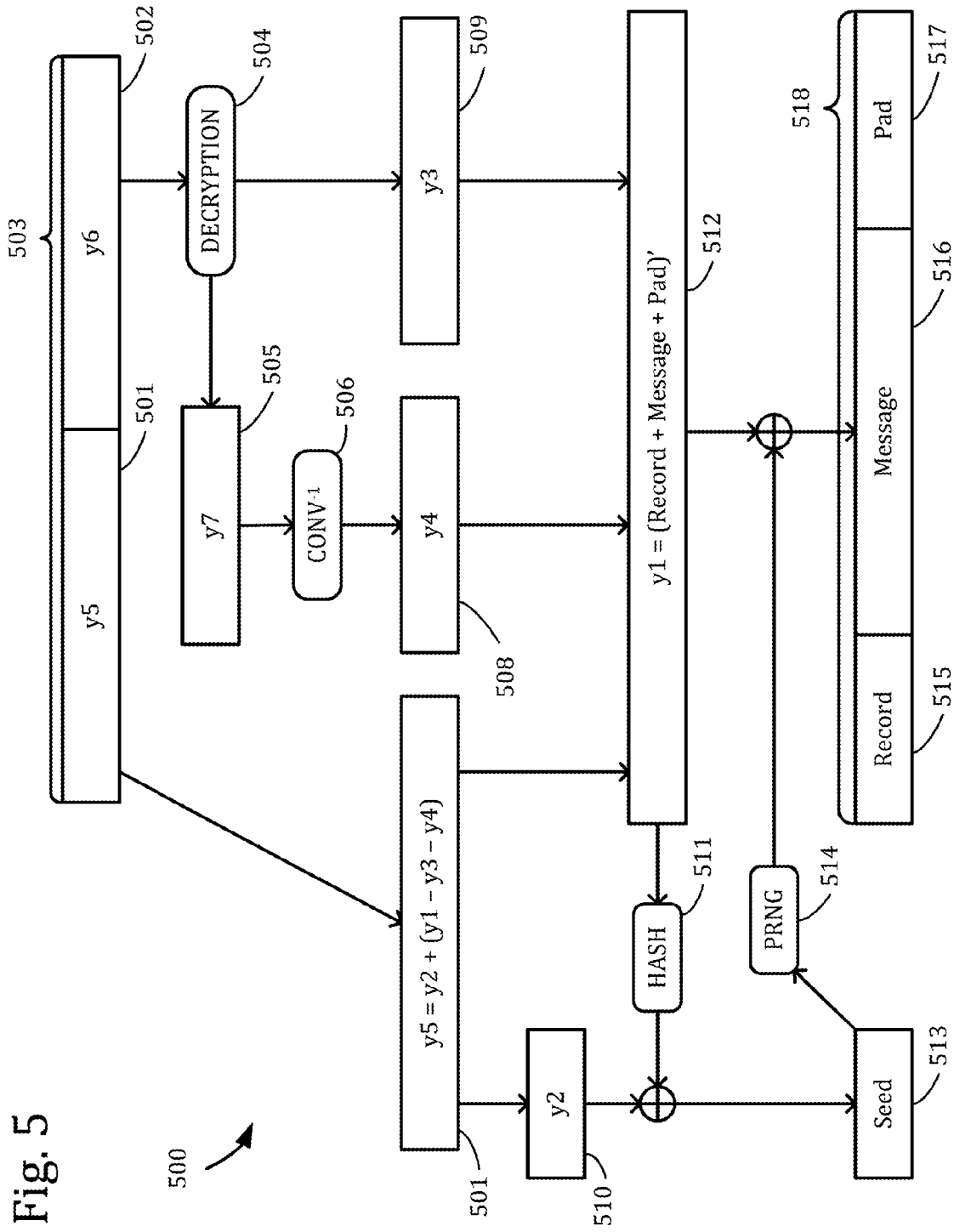
FIG. 5 is a flow diagram showing an example process for decrypting a ciphertext.

FIG. 4 is a flow diagram showing an example process 400 for decrypting a ciphertext. The example process 400 can be performed, for example, by a computer system. For instance, operations in the process 400 may be performed by either of the nodes 102, 104 in the example communication system 100 shown in FIG. 1 or by another type of computing system. In some cases, one or more of the operations shown in FIG. 2 are implemented as processes that include multiple operations, sub-processes or other types of routines. In some cases, operations can be combined, performed in parallel, iterated or otherwise repeated or performed in another manner. The process 500 shown in FIG. 5 represents an example implementation of the process 400 shown in FIG. 4; while certain operations shown in FIG. 4 are described with reference to the example implementation shown in FIG. 5, the operations shown in FIG. 4 may be implemented in another manner.

In some instances, the example process 400 shown in FIG. 4 is used to decrypt the ciphertext generated by the example process 200 shown in FIG. 2. Accordingly, the process 400 may generate the message that was provided as an input in the process 200. The process 400 may use various functions and cryptographic parameters that are the same as or associated with (e.g., the inverse of) one or more functions or parameters used in the process 200. The process 400 may use a private key that is associated with a public key used in the encryption function applied in the example process 200.

At 410, a decryption function is applied to the ciphertext. In some implementations, the decryption function is applied to a first portion of the ciphertext to yield a decryption function output. The encryption function may generate the decryption function output based on the ciphertext and additional information such as, for example, a private key. In some implementations, applying the decryption function produces a first decryption function output and a second decryption function output. For instance, in the example shown in FIG. 5, the decryption function 504 is applied to the sixth bit vector 502 to yield the third bit vector 509 and the seventh bit vector 505. In some implementations, an inverse conversion function is applied to the second decryption function output to yield a bit vector. For instance, in the example shown in FIG. 5, the inverse conversion function 506 is applied to the seventh bit vector 505 to generate the fourth bit vector 508.

At 420, an object (e.g., a cleartext) is generated based on the decryption function output. In the example shown in FIG. 5, the first bit vector 512 is generated based on the output of the decryption function 504. In some implementations, the object includes the decryption function output or the object is otherwise derived from all or part of the decryption function output. In some implementations, the object includes a first decryption function output and a bit vector based on the second decryption function output (e.g., the bit vector generated by an inverse conversion function). In the example shown in FIG. 5, the first bit vector 512 includes the third bit vector 509 and the fourth bit vector 508. In some implementations, the object also includes a second portion of the ciphertext. For instance, the second portion of the ciphertext may include at least part of the portion of the ciphertext that the decryption function was not applied to. In the example shown in FIG. 5, the first bit vector 512 can include part of the fifth bit vector 501, and the second portion of the ciphertext 503 (which is included in the first bit vector 512) is the portion of the fifth bit vector 501 that remains after the second bit vector 510 is removed from the fifth bit vector 501.

At 430, a hash function is applied to the object generated at 420. In the example process shown in FIG. 4, the hash function applied at 430 is the same hash function that was used in generating the ciphertext. For instance, the hash function applied at 430 in FIG. 4 can be the same hash function applied at 250 in FIG. 2, or another hash function may be used in some instances. Applying the hash function to the object (e.g., the cleartext) yields a hash function output. In the example shown in FIG. 5, the hash function 511 is applied to the first bit vector 512 to yield a hash function output.

At 440, random information is obtained based on the hash function output generated at 430. The random information can be, for example, a random bit string produced by a pseudorandom number generator. The output of the pseudorandom number generator can be obtained after seeding the pseudorandom number generator with a seed. In some implementations, the seed is generated by applying an exclusive-or function to the hash function output and a second bit vector; the second bit vector can include a third portion of the ciphertext. In the example process 400, the random information obtained at 440 is the same random information that was used in generating the ciphertext. For example, the random information obtained at 440 can be the random information applied at 240 in FIG. 2. In the example shown in FIG. 5, the second bit vector 510 is parsed from the fifth bit vector 501, and an exclusive-or (XOR) function is applied to the hash function output and the second bit vector 510 to yield the seed bit vector 513; the random information is obtained from the PRNG 514 after the PRNG 514 has been seeded with the seed bit vector 513.

At 450, a decoded object is generated based on the hash function output and the object generated at 420. In the example shown in FIG. 5, the decoded bit vector 518 is generated from the first bit vector 512. The decoded object (e.g., a decoded cleartext) can be generated by applying an exclusive-or operation to the object (e.g., the cleartext) and an output of a pseudorandom number generator. In the example shown in FIG. 5, an exclusive-or function is applied to the first bit vector 512 and the output of the PRNG 514. In the example shown in FIG. 5, the output of the PRNG 514 is used as a random bit string in the XOR operation applied to the first bit vector 512 after the PRNG 514 is seeded with the seed bit vector 513.

In some implementations, the decoded object includes a record, a message and a pad. The message can be the plaintext message that was used as the basis for generating the ciphertext. The pad can a bit vector appended to the plaintext message, and the record can indicate the size of the pad. In some cases, the pad, the record and the message in the decoded object generated at 450 are equivalent to the pad, the record and the message that are combined at 230 in FIG. 2. In the example shown in FIG. 5, the decoded object is the decoded bit vector 518, which includes the record bit vector 515, the message bit vector 516, and the pad bit vector 517. The pad is based on the size of the message, for example, as described with respect to operation 210 shown in FIG. 2.

At 460, the size of the pad is detected based on the record. For example, the record may indicate the size of the pad as described with respect to operation 220 shown in FIG. 2. Thus, the size of the pad may be detected by reading or interpreting the binary value represented by the record. In the example shown in FIG. 5, the size of the pad bit vector 517 is explicitly represented by the record bit vector 515.

At 470, the message is identified from the decoded object. The message can be identified, for example, by identifying one or more boundaries of the message based on the size of the pad detected at 460. In the example shown in FIG. 5, the message bit vector 516 is identified within the decoded bit vector 518 based on the size of the pad bit vector 517 indicated by the record bit vector 515, for example, by identifying one or both boundaries of the message bit vector 516 in the decoded bit vector 518. In some examples, one of the boundaries may be detected based on a known size of the record, and the other boundary may be detected based on the detected size of the pad. In some implementations, the message is extracted from the decoded object. For example, the message may be extracted by parsing the decoded object at one or more boundaries. In the example shown in FIG. 5, the message bit vector 516 can be extracted by parsing the decoded bit vector 518 at the boundaries of the record bit vector 515 and the pad bit vector 517.

In some implementations, the pad obtained from the decryption process 400 is compared against a trusted pad that can be computed from a public constant, for example, to verify ciphertext integrity. The trusted pad can be generated, for example, by a hash function, a key derivation function or another type of function that receives a public constant as input. In some instances, detecting that the pad extracted from the decoded object does not match the trusted pad indicates that the ciphertext has been altered or that the decryption process has introduced an error. In some instances, detecting that the pad extracted from the decoded object matches the trusted pad indicates that the message identified at 470 is reliable.

FIG. 5 is a flow diagram showing an example process for decrypting a ciphertext. The example process 500 can be performed, for example, by a computer system. For instance, operations in the process 500 may be performed by either of the nodes 102, 104 in the example communication system 100 shown in FIG. 1 or in another type of system. The example process 500 may include additional or different operations, and the operations may be performed in the order shown or in another order. In some cases, one or more of the operations shown in FIG. 5 are implemented as processes that include multiple operations, sub-processes or other types of routines. In some cases, operations can be combined, performed in parallel, iterated or otherwise repeated or performed in another manner.

In some instances, the example process 500 shown in FIG. 5 is used to decrypt the ciphertext 317 generated by the example process 300 shown in FIG. 3. In such instances, the corresponding labels (y1, y2, y3, y4, y5, y6, y7) in FIGS. 3 and 5 indicate corresponding bit vectors (in some cases, equivalent or identical bit vectors). Accordingly, the process 500 may generate a message bit vector 516 that is equivalent to or identical to the message bit vector 301 that was provided as an input in the process 300. The process 500 may use various functions and parameters that are the same as or complementary to (e.g., the inverse of) one or more functions or parameters used in the process 300. The process 500 may use a private key that is associated with a public key used in the encryption function applied in the example process 300.

The example process 500 shown in FIG. 5 includes a pseudorandom number generator (PRNG) 514, a hash function 511, an inverse conversion function 506 and a decryption function 504. The process 500 also includes exclusive-or functions. The process 500 may include additional or different functions. The functions in the process 500 can be implemented, for instance, in software, hardware firmware or combinations thereof. Generally, each function receives one or more input bit vectors and produces one or more output bit vectors. In the discussion of FIG. 5, the size of a bit vector refers to the bit-length of the object in units of bits. The size of a bit vector (or other data object) may be defined in another manner, for instance, in units of bytes, multi-byte words or otherwise. Moreover, a bit vector as described with respect to FIG. 5, may be implemented as a bit array, a bit string or another type of binary data object.

The exclusive-or (XOR) functions applied in the example process 500 are each configured to receive two XOR function inputs and produce an XOR function output. The exclusive-or functions shown in FIG. 5 can be the same as or similar to the exclusive-or functions shown in FIG. 3.

The example PRNG 514 is configured to receive a seed bit vector 513 of size h and produce a pseudorandom binary sequence. The seed bit vector 513 can be, for example, a random value having a fixed size h. The size of the output produced by the PRNG 514 can be specified, for instance, based on the size of the first bit vector 512. The example PRNG 514 shown in FIG. 5 can be the same as or similar to the PRNG 306 shown in FIG. 3.

The example hash function 511 is a cryptographic hash function configured to receive a variable-size input and produce a fixed-size output of size h. As shown in FIG. 5, the first bit vector 512 is provided as the hash function input, and the size of the first bit vector 512 depends on the size of the ciphertext 503. The example hash function 511 shown in FIG. 5 can be the same as or similar to the hash function 308 shown in FIG. 3.

The example inverse conversion function 506 is configured to receive an inverse conversion function input of size n and produce an inverse conversion function output of size q. The example inverse conversion function 506 shown in FIG. 5 can be the inverse of the conversion function 313 shown in FIG. 3. For instance, the inverse conversion function 506 can be a bijective function that converts the seventh bit vector 505 to a fourth bit vector 508. The bijective function can convert each possible input of size n to a unique output of size q. In some implementations, the inverse conversion function 506 may have access to a precomputed database that indexes all possible bit vectors having the specified weight t, or the inverse conversion function 506 may be able to compute an index given a specified bit vector; and the fourth bit vector 508 can be the index corresponding to the seventh bit vector 505.

The example decryption function 504 is configured to receive a first decryption function input of size n and produce a first decryption function output of size k and a second decryption function output of size n. The decryption function 504 shown in FIG. 5 can be the inverse of, or otherwise complementary to, the encryption function 315 shown in FIG. 3. For example, the encryption function may be based on the McEliece cryptography system or the Niederreiter cryptography system.

In the example shown in FIG. 5, the sixth bit vector 502 is provided as the decryption function input, the third bit vector 509 is provided as the first decryption function output and the seventh bit vector 505 is provided as the second decryption function output. The sixth bit vector 502 can be considered the ciphertext for the decryption function 504, and the third bit vector 509 can be considered the plaintext that is produced by applying the decryption function 504 to the sixth bit vector 502. The seventh bit vector 505 is provided as an additional output from the decryption function 504. The decryption function 504 may receive additional input such as, for example, a private key or another input parameter that is used to generate the decryption function output.

As shown in FIG. 5, the ciphertext 503 is received as an input to the example process 500. The ciphertext 503 includes the fifth bit vector 501 and the sixth bit vector 502. The decryption function 504 is applied to the sixth bit vector 502 to yield the third bit vector 509 and the seventh bit vector 505. The inverse conversion function 506 is applied to the seventh bit vector 505 to yield the fourth bit vector 508. The fifth bit vector 501 is parsed to yield the second bit vector 510. The remaining portion of the fifth bit vector 501 (the portion remaining after parsing the second bit vector 510) is combined with the third bit vector 509 and the fourth bit vector 508 to yield the first bit vector 512. In particular, the first bit vector 512 is formed by concatenating a portion of the fifth bit vector 501, the third bit vector 509 and the fourth bit vector 508.

As shown in FIG. 5, the hash function is applied to the first bit vector 512, and an exclusive-or function is applied to the hash function output and the second bit vector 510 to yield the seed bit vector 513, the seed bit vector 513 is used to seed the PRNG 514. The PRNG output from the seeded PRNG 514 is used as a random bit string in an exclusive-or function applied to the first bit vector 512. Applying the exclusive-or function to the PRNG output and the first bit vector 512 yields the decoded bit vector 518. The decoded bit vector 518 includes the record bit vector 515, the message bit vector 516 and the pad bit vector 517. The record bit vector 515 indicates the size of the pad bit vector 517. The message bit vector 516 can be identified and extracted from the decoded bit vector 518 based on the size indicated by the pad bit vector 517. In some implementations, the pad bit vector 517 is compared against a trusted pad, for example, to verify ciphertext integrity. In some implementations, the trusted pad is obtained by applying a hash function or key derivation function to a public parameter (e.g., a public bit string), by retrieving a predetermined value from memory, or by another technique.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, a conversion scheme implemented in a cryptographic protocol.

In a first example, a computer-implemented encryption method includes generating a pad bit vector based on a size of a message bit vector, and generating a record bit vector based on the pad bit vector. The record bit vector indicates the size of the pad bit vector. The record bit vector, the message bit vector, and the pad bit vector are combined to yield a first bit vector. A hash function is applied to the first bit vector to yield a hash function output, and an encryption function is applied to a first portion of the first bit vector to yield an encryption function output. A ciphertext is generated based on the hash function output and the encryption function output.

Implementations of the first example may include one or more of the following features. Generating the pad bit vector can include sizing the pad bit vector based on the size of the message bit vector. Generating the pad bit vector can include determining a size for the pad bit vector based on the size of the message bit vector, and applying a hash function to a public parameter to yield the pad bit vector having the determined size. Generating the pad bit vector can include determining a size for the pad bit vector based on the size of the message bit vector and a parameter of the encryption function. The parameter of the encryption function can be the size of an input to the encryption function. Generating the pad bit vector can include determining a size for the pad bit vector based on the size of the message bit vector and a parameter of a conversion function that generates an input for the encryption function. The parameter of the conversion function can be the size of an input to the conversion function.

Implementations of the first example may include one or more of the following features. A conversion function can be applied to a second portion of the first bit vector to yield a converted bit vector. The converted bit vector can be provided as an input to the encryption function applied to the first portion of the first bit vector. The encryption function can be configured to receive first and second encryption function inputs, and the conversion function can be configured to receive a conversion function input. Applying the encryption function can include providing the first portion of the first bit vector as the first encryption function input, and providing the converted bit vector as the second encryption function input. Applying the conversion function can include providing the second portion of the first bit vector as the conversion function input. Generating the pad bit vector can include determining a size for the pad bit vector based on the size of the message bit vector, the size of the first encryption function input and the size of the conversion function input. The size of the pad bit vector can be determined such that the size of the first bit vector is greater than or equal to (q+k) bits, where k represents a size specified by the encryption function for the first encryption function input, and q represents a size specified by the conversion function for the conversion function input.

Implementations of the first example may include one or more of the following features. Combining the record bit vector, the message bit vector, and the pad bit vector can include concatenating the record bit vector, the message bit vector, and the pad bit vector, and applying an exclusive-or function to the concatenation and an output of a pseudorandom number generator. The output of the pseudorandom number generator can be obtained after seeding the pseudorandom number generator with a seed bit vector. The exclusive-or function can be applied to the hash function output and the seed bit vector to yield a second bit vector. The ciphertext can be generated based on the second bit vector and the encryption function output. The second bit vector can be combined with a third portion of the first bit vector to yield a fifth bit vector. The ciphertext can include the fifth bit vector and the encryption function output.

In a second example, a computer-implemented decryption method includes applying a decryption function to a first portion of a ciphertext to yield a decryption function output. A first bit vector is generated based on the decryption function output. A hash function is applied to the first bit vector to yield a hash function output. A decoded bit vector is generated based on the hash function output and the first bit vector. The decoded bit vector includes a record bit vector, a message bit vector, and a pad bit vector. The record bit vector indicates a size of the pad bit vector. The message bit vector is identified based on the size of the pad bit vector, as indicated by the record bit vector.

Implementations of the second example may include one or more of the following features. The decryption function output can be a first decryption function output, and applying the decryption function can produce the first decryption function output and a second decryption function output. An inverse conversion function can be applied to the second decryption function output to yield a fourth bit vector. The first bit vector can include the first decryption function output and the fourth bit vector. The first bit vector can include the first decryption function output, the fourth bit vector, and a second portion of the ciphertext.

Implementations of the second example may include one or more of the following features. The decoded bit vector can be generated by applying an exclusive-or function to the first bit vector and an output of a pseudorandom number generator. An exclusive-or function can be applied to the hash function output and a second bit vector to yield a seed bit vector. The second bit vector can include another portion of the ciphertext. The output of the pseudorandom number generator can be obtained after seeding the pseudorandom number generator with the seed bit vector.

Implementations of the second example may include one or more of the following features. Identifying the message bit vector can include identifying a boundary of the message bit vector in the decoded bit vector. The message bit vector can be extracted by parsing the decoded bit vector at the identified boundary. The pad bit vector can be compared with a trusted value (e.g., a trusted pad bit vector).

In some implementations, a computing system includes a data processing apparatus and a computer-readable medium storing instructions that are operable when executed by the data processing apparatus to perform one or more operations of the first example or the second example or both. In some implementations, a computer-readable medium stores instructions that are operable when executed by a data processing apparatus to perform one or more operations of the first example or the second example or both.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A computer-implemented encryption method, comprising:
    generating a pad bit vector based on a size of a message bit vector;
    generating a record bit vector based on the pad bit vector, the record bit vector indicating a size of the pad bit vector;
    combining the record bit vector, the message bit vector, and the pad bit vector to yield a first bit vector;
    by operation of one or more processors, applying a hash function to the first bit vector to yield a hash function output;
    by operation of one or more processors, applying a conversion function to a second portion of the first bit vector to yield a converted bit vector, wherein the conversion function is configured to receive a conversion function input and applying the conversion function comprises providing the second portion of the first bit vector as the conversion function input;
    by operation of the one or more processors, applying an encryption function to a first portion of the first bit vector to yield an encryption function output, wherein the encryption function is configured to receive first and second encryption function inputs and applying the encryption function comprises providing the first portion of the first bit vector as the first encryption function input and providing the converted bit vector as the second encryption function input;
    generating a ciphertext based on the hash function output and the encryption function output; and
    providing the ciphertext for communication to a node in a communication system;
    wherein generating the pad bit vector comprises determining a size of the pad bit vector based on the size of the message bit vector, a size of the first encryption function input and a size of the conversion function input.

2. The method of claim 1, wherein generating the pad bit vector comprises sizing the pad bit vector based on the size of the message bit vector.

3. The method of claim 1, wherein generating the pad bit vector comprises determining a size for the pad bit vector and generating the pad bit vector having the determined size.

4. The method of claim 1, wherein the size of the pad bit vector is determined such that the size of the first bit vector is greater than or equal to (q+k) bits, where k represents a size specified by the encryption function for the first encryption function input, and q represents a size specified by the conversion function for the conversion function input.

5. The method of claim 1, wherein combining the record bit vector, the message bit vector, and the pad bit vector comprises:
    concatenating the record bit vector, the message bit vector, and the pad bit vector; and
    applying an exclusive-or function to the concatenation and an output of a pseudorandom number generator.

6. The method of claim 5, comprising:
    obtaining the output of the pseudorandom number generator after seeding the pseudorandom number generator with a seed bit vector; and
    applying an exclusive-or function to the hash function output and the seed bit vector to yield a second bit vector, wherein the ciphertext is generated based on the second bit vector and the encryption function output.

7. The method of claim 6, comprising combining the second bit vector with a third portion of the first bit vector to yield a fifth bit vector, wherein the ciphertext comprises the fifth bit vector and the encryption function output.

8. The method of claim 1, comprising applying a conversion scheme that allows messages of arbitrary size to be encrypted.

9. The method of claim 1, comprising applying a conversion scheme that hides the size of messages below a threshold size.

10. A computing system comprising:
a data processing apparatus;
a computer-readable medium storing instructions that are operable when executed by the data processing apparatus to perform operations comprising:
generating a pad bit vector based on a size of a message bit vector;
generating a record bit vector based on the pad bit vector, the record bit vector indicating a size of the pad bit vector;
combining the record bit vector, the message bit vector, and the pad bit vector to yield a first bit vector;
applying a hash function to the first bit vector to yield a hash function output;
applying a conversion function to a second portion of the first bit vector to yield a converted bit vector, wherein the conversion function is configured to receive a conversion function input and applying the conversion function comprises providing the second portion of the first bit vector as the conversion function input;
applying an encryption function to a first portion of the first bit vector to yield an encryption function output, wherein the encryption function is configured to receive first and second encryption function inputs and applying the encryption function comprises providing the first portion of the first bit vector as the first encryption function input and providing the converted bit vector as the second encryption function input; and
generating a ciphertext based on the hash function output and the encryption function output; and
providing the ciphertext for communication to a node in a communication system;
wherein generating the pad bit vector comprises determining a size of the pad bit vector based on the size of the message bit vector, a size of the first encryption function input and a size of the conversion function input.

11. The computing system of claim 10, wherein generating the pad bit vector comprises sizing the pad bit vector based on the size of the message bit vector.

12. The computing system of claim 10, the operations comprising:
applying a conversion function to a second portion of the first bit vector to yield a converted bit vector; and
providing the converted bit vector as an input to the encryption function applied to the first portion of the first bit vector.

13. The computing system of claim 10, wherein combining the record bit vector, the message bit vector, and the pad bit vector comprises:
concatenating the record bit vector, the message bit vector, and the pad bit vector; and
applying an exclusive-or function to the concatenation and an output of a pseudorandom number generator.

14. The computing system of claim 13, the operations comprising:
obtaining the output of the pseudorandom number generator after seeding the pseudorandom number generator with a seed bit vector; and
applying an exclusive-or function to the hash function output and the seed bit vector to yield a second bit vector, wherein the ciphertext is generated based on the second bit vector and the encryption function output.

15. The computing system of claim 14, the operations comprising combining the second bit vector with a third portion of the first bit vector to yield a fifth bit vector, wherein the ciphertext comprises the fifth bit vector and the encryption function output.

16. A computer-implemented decryption method, comprising:
obtaining a ciphertext received from a node of a communication system;
by operation of one or more processors, applying a decryption function to a portion of the ciphertext to yield a first decryption function output and a second decryption function output;
by operation of one or more processors, applying an inverse conversion function to the second decryption function output to yield a fourth bit vector;
generating a first bit vector based on the first decryption function output wherein the first bit vector comprises the first decryption function output, the fourth bit vector, and another portion of the ciphertext;
by operation of one or more processors, applying a hash function to the first bit vector to yield a hash function output;
generating a decoded bit vector based on the hash function output and the first bit vector, the decoded bit vector comprising a record bit vector, a message bit vector, and a pad bit vector, the record bit vector indicating a size of the pad bit vector;
identifying the message bit vector based on the size of the pad bit vector indicated by the record bit vector.

17. The method of claim 16, wherein generating the decoded bit vector comprises applying an exclusive-or function to the first bit vector and an output of a pseudorandom number generator.

18. The method of claim 17, comprising:
applying an exclusive-or function to the hash function output and a second bit vector to yield a seed bit vector, wherein the second bit vector comprises another portion of the ciphertext; and
obtaining the output of the pseudorandom number generator after seeding the pseudorandom number generator with the seed bit vector.

19. The method of claim 16, wherein identifying the message bit vector comprises identifying a boundary of the message bit vector in the decoded bit vector.

20. The method of claim 19, comprising extracting the message bit vector by parsing the decoded bit vector at the identified boundary.

21. The method of claim 16, further comprising comparing the pad bit vector with a trusted value.

22. A computing system comprising:
a data processing apparatus;
a computer-readable medium storing instructions that are operable when executed by the data processing apparatus to perform operations comprising:
obtaining a ciphertext received from a node of a communication system;
applying a decryption function to a portion of the ciphertext to yield a first decryption function output and a second decryption function output;
applying an inverse conversion function to the second decryption function output to yield a fourth bit vector;
generating a first bit vector based on the first decryption function output wherein the first bit vector comprises the first decryption function output, the fourth bit vector, and another portion of the ciphertext;
applying a hash function to the first bit vector to yield a hash function output;

generating a decoded bit vector based on the hash function output and the first bit vector, the decoded bit vector comprising a record bit vector, a message bit vector, and a pad bit vector, the record bit vector indicating a size of the pad bit vector;

identifying the message bit vector based on the size of the pad bit vector indicated by the record bit vector.

23. The computing system of claim 22, wherein generating the decoded bit vector comprises applying an exclusive-or function to the first bit vector and an output of a pseudorandom number generator.

24. The computing system of claim 22, wherein identifying the message bit vector comprises identifying a boundary of the message bit vector in the decoded bit vector, and the operations comprise extracting the message bit vector by parsing the decoded bit vector at the identified boundary.

25. The computing system of claim 22, the operations further comprising comparing the pad bit vector with a trusted value.

* * * * *

UNITED STATES PATENT AND TRADEMARK OFFICE
CERTIFICATE OF CORRECTION

PATENT NO.         : 9,614,668 B1
APPLICATION NO.    : 15/265355
DATED              : April 4, 2017
INVENTOR(S)        : Sean Simmons and Jaiyuan Sui It is certified that error appears in the above-identified patent and that said Letters Patent is hereby corrected as shown below:

In the Claims

In Claim 10 at Column 23, Line 30: delete "input; and" and insert --input;-- therefor In Claim 16 at Column 24, Line 16: delete "output" and insert --output,-- therefor In Claim 22 at Column 24, Line 63: delete "output" and insert --output,-- therefor Signed and Sealed this
Thirtieth Day of May, 2017

Michelle K. Lee
*Director of the United States Patent and Trademark Office*